(12) United States Patent
Koishi (10) Patent No.: US 12,034,920 B2
(45) Date of Patent: Jul. 9, 2024

(54) COMMUNICATION CONTROL SYSTEM AND COMMUNICATION CONTROL METHOD

(71) Applicant: NEC Corporation, Tokyo (JP)

(72) Inventor: Takahiro Koishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 84 days.

(21) Appl. No.: 17/801,121

(22) PCT Filed: Mar. 10, 2021

(86) PCT No.: PCT/JP2021/009512
§ 371 (c)(1),
(2) Date: Aug. 19, 2022

(87) PCT Pub. No.: WO2021/182506
PCT Pub. Date: Sep. 16, 2021

(65) Prior Publication Data
US 2023/0077785 A1 Mar. 16, 2023

(30) Foreign Application Priority Data
Mar. 11, 2020 (JP) .................. 2020-041849

(51) Int. Cl.
*H04N 19/115* (2014.01)
*H04N 19/164* (2014.01)
(Continued)

(52) U.S. Cl.
CPC ......... *H04N 19/115* (2014.11); *H04N 19/164* (2014.11); *H04N 19/172* (2014.11);
(Continued)

(58) Field of Classification Search
CPC .. H04N 19/115; H04N 19/164; H04N 19/172; H04L 65/40
See application file for complete search history.

(56) References Cited

U.S. PATENT DOCUMENTS 5,719,632 A 2/1998 Hoang et al.
6,204,932 B1 3/2001 Haneda et al.
(Continued)

FOREIGN PATENT DOCUMENTS

JP H09-214962 A 8/1997
JP 2000-347999 A 12/2000
(Continued)

OTHER PUBLICATIONS

International Search Report for PCT Application No. PCT/JP2021/009512, mailed on May 18, 2021.
(Continued)

*Primary Examiner* — Richard T Torrente
(74) *Attorney, Agent, or Firm* — Sughrue Mion, PLLC (57) ABSTRACT

The present disclosure provides a communication control system and a communication control method capable of appropriately modifying an image compression algorithm when transmitting an I/O signal and an image signal through the same transmission line. In a communication control system that transmits image frame data and I/O data through the same transmission line from a first communication device to a second communication device, a transmission history of image frame data and I/O data and a reception history of ACK for the image frame data and ACK for the I/O data are managed. ACK receiving time and bandwidth utilization are calculated for each of the image frame data and the I/O data from the transmission history and the reception history.

5 Claims, 8 Drawing Sheets (51) Int. Cl.
*H04N 19/172* (2014.01)
*H04N 21/44* (2011.01)
*H04N 21/6373* (2011.01)
*H04N 21/647* (2011.01)

(52) U.S. Cl.
CPC ... *H04N 21/44004* (2013.01); *H04N 21/6373* (2013.01); *H04N 21/64738* (2013.01)

(56) References Cited

U.S. PATENT DOCUMENTS

| | | | |
|---|---|---|---|
| 2003/0043272 | A1 | 3/2003 | Nagao et al. |
| 2013/0058396 | A1 | 3/2013 | Shimizu et al. |
| 2015/0244760 | A1* | 8/2015 | Tun .................. H04L 65/80 709/223 |
| 2016/0261373 | A1 | 9/2016 | Nagasaka et al. |
| 2017/0264519 | A1 | 9/2017 | Kanou |
| 2018/0288650 | A1 | 10/2018 | Suzuki et al. |
| 2018/0332342 | A1* | 11/2018 | Wu ................. H04N 21/6375 |

FOREIGN PATENT DOCUMENTS

| | | |
|---|---|---|
| JP | 2002-534864 A | 10/2002 |
| JP | 2005-126941 A | 5/2005 |
| JP | 2008-301309 A | 12/2008 |
| JP | 2017-163316 A | 9/2017 |
| JP | 2019-114947 A | 7/2019 |
| WO | 2011/138900 A1 | 11/2011 |
| WO | 2015/052843 A1 | 4/2016 |
| WO | 2016/088582 A1 | 6/2016 |

OTHER PUBLICATIONS

U.S. Office Action for U.S. Appl. No. 17/801,128 mailed on Nov. 24, 2023.
International Search Report for PCT Application No. PCT/JP2021/009535, mailed on Jun. 1, 2021.

* cited by examiner

| IMAGE BUFFER UTILIZATION (%) | TRANSMISSION DELAY (ms) |
|---|---|
| 95 | T1 |
| 90 | T2 |
| 85 | T3 |
| 80 | T4 |
| 70 | T5 |
| ⋮ | ⋮ |
| 0 | Tn |

Fig. 5

| I/O BUFFER UTILIZATION (%) | TRANSMISSION DELAY (ms) |
|---|---|
| 95 | T1 |
| 90 | T2 |
| 85 | T3 |
| 80 | T4 |
| 70 | T5 |
| ⋮ | ⋮ |
| 0 | Tn |

Fig. 6

| ESTIMATED BANDWIDTH UTILIZATION (%) | COMPRESSION RATIO |
|---|---|
| 95 | a |
| 90 | b |
| 85 | c |
| 80 | d |
| 70 | e |
| ... | ... |
| 0 | n |

COMMUNICATION CONTROL SYSTEM AND COMMUNICATION CONTROL METHOD

This application is a National Stage Entry of PCT/JP2021/009512 filed on Mar. 10, 2021, which claims priority from Japanese Patent Application 2020-041849 filed on Mar. 11, 2020, the contents of all of which are incorporated herein by reference, in their entirety.

TECHNICAL FIELD

The present disclosure relates to a communication control system and a communication control method.

BACKGROUND ART

A communication system transmits communication frame data from a first communication device (transmitting end) to a second communication device (receiving end), and returns an ACK frame for this communication frame data from the second communication device to the first communication device. The ACK frame is given a number corresponding to the received frame and returned to the transmitting end. The transmitting end thereby recognizes that data receiving has failed at the receiving end and, in some cases, transmits this communication frame data again.

For example, Patent Literature 1 discloses a computer system in which one or more central processing units are configured to connect a disk control unit through a fiber channel, wherein the disk control unit delays the transmission of a response frame in response to a frame received from the central processing unit when the multiplicity of exchanges, which is a series of transmitting and receiving sequences of commands and data exchanged with the central processing unit, exceeds a predetermined threshold.

CITATION LIST

Patent Literature

PTL1: Japanese Unexamined Patent Application Publication No. 2000-347999

SUMMARY OF INVENTION

Technical Problem

Existing communication systems are unable to appropriately modify an image compression algorithm when transmitting an I/O signal and an image signal through the same transmission line. This may cause the lack of an image in a communication device at the receiving end because of the buffer overflow.

The present invention has been accomplished to solve the above problems and an object of the present invention is thus to provide a communication control system and a communication control method capable of appropriately modifying an image compression algorithm when transmitting an I/O signal and an image signal through the same transmission line.

Solution to Problem

A communication control system according to a first aspect of the present disclosure is a communication control system that transmits image frame data and I/O data through the same transmission line from a first communication device to a second communication device, the second communication device including a frame receiving buffer configured to receive image frame data from the first communication device; an I/O receiving buffer configured to receive I/O data from the first communication device; and a return unit configured to return an image ACK frame to the first communication device at timing reflecting a utilization rate of the frame receiving buffer, and return an I/O ACK frame to the first communication device at timing reflecting a utilization rate of the I/O receiving buffer, and the first communication device including an estimation unit configured to receive the image ACK frame from the return unit of the second communication device and estimate the utilization rate of the frame receiving buffer of the second communication device from receiving time of the image ACK frame, receive the I/O ACK frame from the return unit of the second communication device and estimate the utilization rate of the I/O receiving buffer of the second communication device from receiving time of the I/O ACK frame, and thereby estimate bandwidth utilization of the transmission line for the image frame data and the I/O data; a modification unit configured to modify an image compression algorithm of the image frame data on the basis of the utilization rate of the frame receiving buffer and the bandwidth utilization of the transmission line estimated for each of the image frame data and the I/O data; and a transmitting unit configured to transmit the image frame data and the I/O data through the same transmission line from the first communication device to the second communication device.

A communication control method according to a second aspect of the present disclosure is a communication control method that transmits image frame data and I/O data through the same transmission line from a first communication device to a second communication device, including, in the second communication device, receiving image frame data from the first communication device by a frame receiving buffer; receiving I/O data from the first communication device by an I/O receiving buffer; and returning an image ACK frame to the first communication device at timing reflecting a utilization rate of the frame receiving buffer, and returning an I/O ACK frame to the first communication device at timing reflecting a utilization rate of the I/O receiving buffer, and in the first communication device, receiving the image ACK frame from the second communication device and estimating the utilization rate of the frame receiving buffer of the second communication device from receiving time of the image ACK frame, receiving the I/O ACK frame from the second communication device and estimating the utilization rate of the I/O receiving buffer of the second communication device from receiving time of the I/O ACK frame, and thereby estimating bandwidth utilization of the transmission line for each of the image frame data and the I/O data; modifying an image compression algorithm of the image frame data on the basis of the utilization rate of the frame receiving buffer and the bandwidth utilization of the transmission line estimated for each of the image frame data and the I/O data; and transmitting the image frame data and the I/O data through the same transmission line from the first communication device to the second communication device.

Advantageous Effects of Invention

According to the present disclosure, there are provided a communication control system and a communication control method capable of appropriately modifying an image compression algorithm when transmitting an I/O signal and an image signal through the same transmission line.

EXAMPLE EMBODIMENT

First Example Embodiment

An example embodiment of the present invention will be described hereinafter with reference to the drawings.

Figure 1:
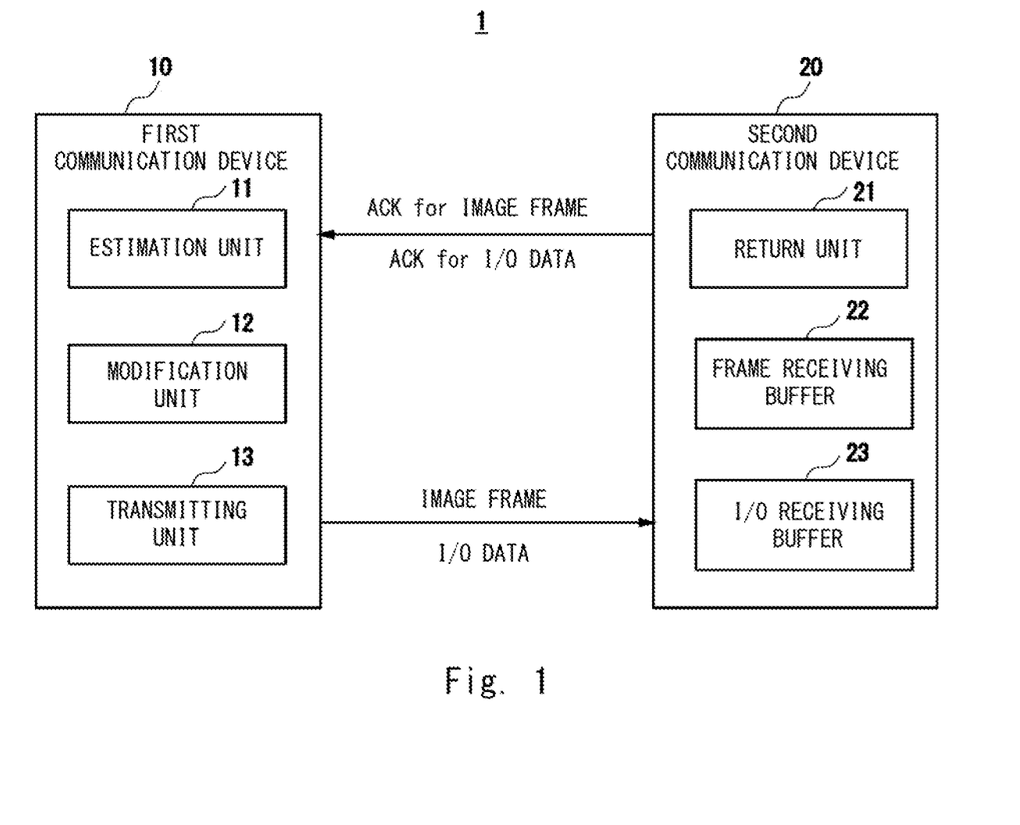
FIG. 1 is a block diagram showing the configuration of a transmitting end communication device according to a first example embodiment.

A communication control system 1 includes a first communication device 10 and a second communication device 20 connected to the first communication device 10 through a network. The first communication device 10 transmits image frame data and I/O data to the second communication device 20 through the same transmission line, and the second communication device 20 returns an ACK frame for this communication frame data and an ACK frame for this I/O data to the first communication device 10.

The second communication device 20 includes a return unit 21, a frame receiving buffer 22, and an I/O receiving buffer 23. The frame receiving buffer 22 receives image frame data from the first communication device 10. The I/O receiving buffer 23 receives I/O data from the first communication device 10. The return unit 21 returns an ACK frame for image to the first communication device 10 at the timing of reflecting the utilization rate of the frame receiving buffer 22, and returns an ACK frame for I/O to the first communication device 10 at the timing of reflecting the utilization rate of the I/O receiving buffer 23.

The first communication device 10 includes an estimation unit 11, a modification unit 12, and a transmitting unit 13. The estimation unit 11 receives an ACK frame for images from the return unit 21 of the second communication device 20, and estimates the utilization rate of the frame receiving buffer 22 of the second communication device 20 on the basis of the receiving time of this ACK frame for images. Further, the estimation unit 11 receives an ACK frame for I/O from the return unit 21 of the second communication device 20, and estimates the utilization rate of the I/O receiving buffer 23 of the second communication device on the basis of the receiving time of this ACK frame for I/O. Further, the estimation unit 11 estimates the bandwidth utilization of the transmission line for the image frame data and the I/O data.

The modification unit 12 modifies an image compression algorithm of the image frame data on the basis of the utilization rate of the image frame receiving buffer and the bandwidth utilization of the transmission line estimated for the image frame data and the I/O data. The image compression algorithm can include color clustering or a compression ratio. The transmitting unit 13 transmits the image frame data and the I/O data from the first communication device 10 to the second communication device 20 through the same transmission line.

Figure 2:
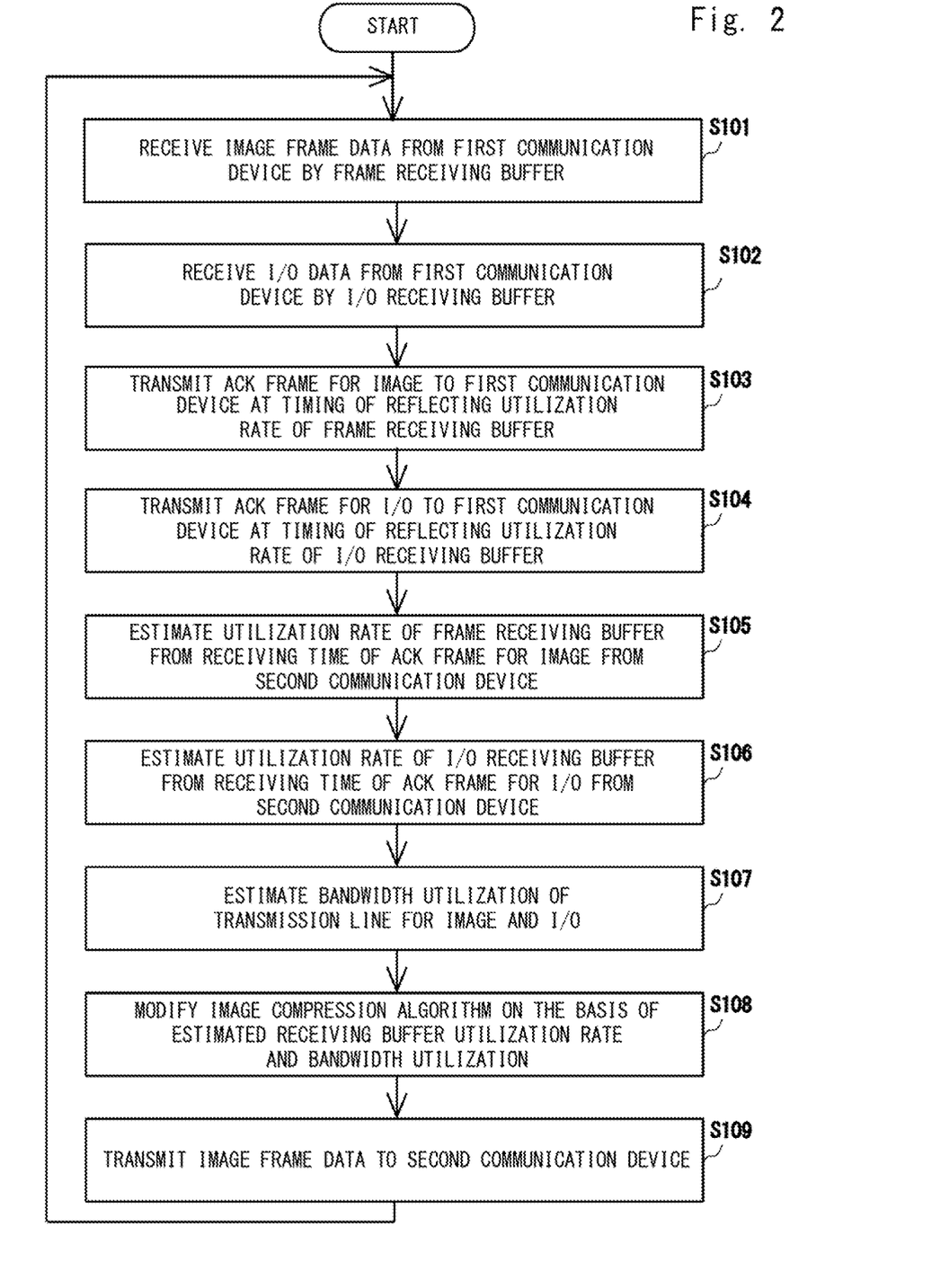
FIG. 2 is a block diagram showing the configuration of a receiving end communication device according to the first example embodiment.

FIG. 2 is a flowchart showing a communication control method according to the first example embodiment.

The communication control method transmits image frame data and I/O data from the first communication device to the second communication device through the same transmission line, and then returns an ACK frame for the communication frame data and an ACK frame for the I/O data from the second communication device to the first communication device.

The second communication device 20 receives the image frame data from the first communication device 10 by a frame receiving buffer (Step S101). The second communication device 20 receives the I/O data from the first communication device 10 by an I/O receiving buffer (Step S102). The second communication device 20 returns an ACK frame for images to the first communication device 10 at the timing of reflecting the utilization rate of the frame receiving buffer (Step S103). The second communication device 20 returns an ACK frame for I/O to the first communication device 10 at the timing of reflecting the utilization rate of the I/O receiving buffer (Step S104).

The first communication device 10 receives the ACK frame for images from the second communication device 20, and estimates the utilization rate of the frame receiving buffer of the second communication device 20 on the basis of the receiving time of this ACK frame for images (Step S105). The first communication device 10 receives the ACK frame for I/O from the second communication device 20, and estimates the utilization rate of the I/O receiving buffer of the second communication device 20 on the basis of the receiving time of this ACK frame for I/O (Step S106). The first communication device 10 then estimates the bandwidth utilization of the transmission line for the image frame data and the I/O data (Step S107). The first communication device 10 modifies the image compression algorithm of this image frame data on the basis of the utilization rate of the frame receiving buffer estimated from the receiving time of the ACK frame for images and the bandwidth utilization of the transmission line estimated for the image frame data and the I/O data (Step S108). The first communication device 10 then transmits the image frame data and the I/O data to the second communication device 20 through the same transmission line (Step S109). After that, the process returns to Step S101.

According to the first example embodiment described above, the image compression algorithm is modified more appropriately by estimating the utilization rate of the receiving buffer of each of the image frame data and the I/O data and the bandwidth utilization of the transmission line.

Second Example Embodiment

This example embodiment relates to a system that remotely transmits image data and I/O transaction data in a mixed manner and performs diagnostic imaging, and particularly relates to a circuit that processes I/O signals for which transmission control is necessary with low latency. Existing diagnostic imaging systems mainly have two issues. A first issue is that, when an image receiving buffer overflows in a diagnostic imaging system, camera image data that overflows from the buffer is discarded in order to continue the diagnostic imaging operation.

The reason is as follows. In general, a diagnostic imaging system is designed to perform a diagnostic process, such as appearance check of products conveyed on a conveyor belt, continuously and at high speed. Therefore, even if a receiving buffer is filled with data, image data to check subsequent products are sent one after another. It is therefore necessary to continue the operation by discarding the overflowing data.

A second issue is that, for I/O transaction data, such as flash control and robot arm actuation, the above diagnostic imaging system is also required to exhibit high reliability so as to avoid the lack of the transaction data while having appropriate bandwidth and latency.

The reason is as follows. For I/O transaction data issued by a CPU, a period of time from issuance to completion of processing is generally specified, and processing such as firing of a flash for photographing and actuation after diagnosis needs to be performed reliably and continuously within this specified period of time.

The diagnostic imaging system that transmits image data and I/O transaction data in a mixed manner according to this example embodiment transmits the I/O transaction data with low-latency and high-reliability, and transmits the image data without discarding the image data necessary for diagnosis in accordance with the condition of the receiving buffer. The diagnostic imaging system according to this example embodiment is thereby designed to improve the degradation of the defect detection rate due to the lack of an image.

The system according to this example embodiment monitors the congestion of a transmission line in real time by using ACK packets exchanged between a camera and a host, for example, and reduces color information and modifies the compression ratio of a codec adaptively depending on the state of congestion. This prevents the lack of an inspection image due to the overflow of transmitting and receiving buffers and thereby solves the degradation of the defect detection rate of the diagnostic imaging system.

Figure 3:
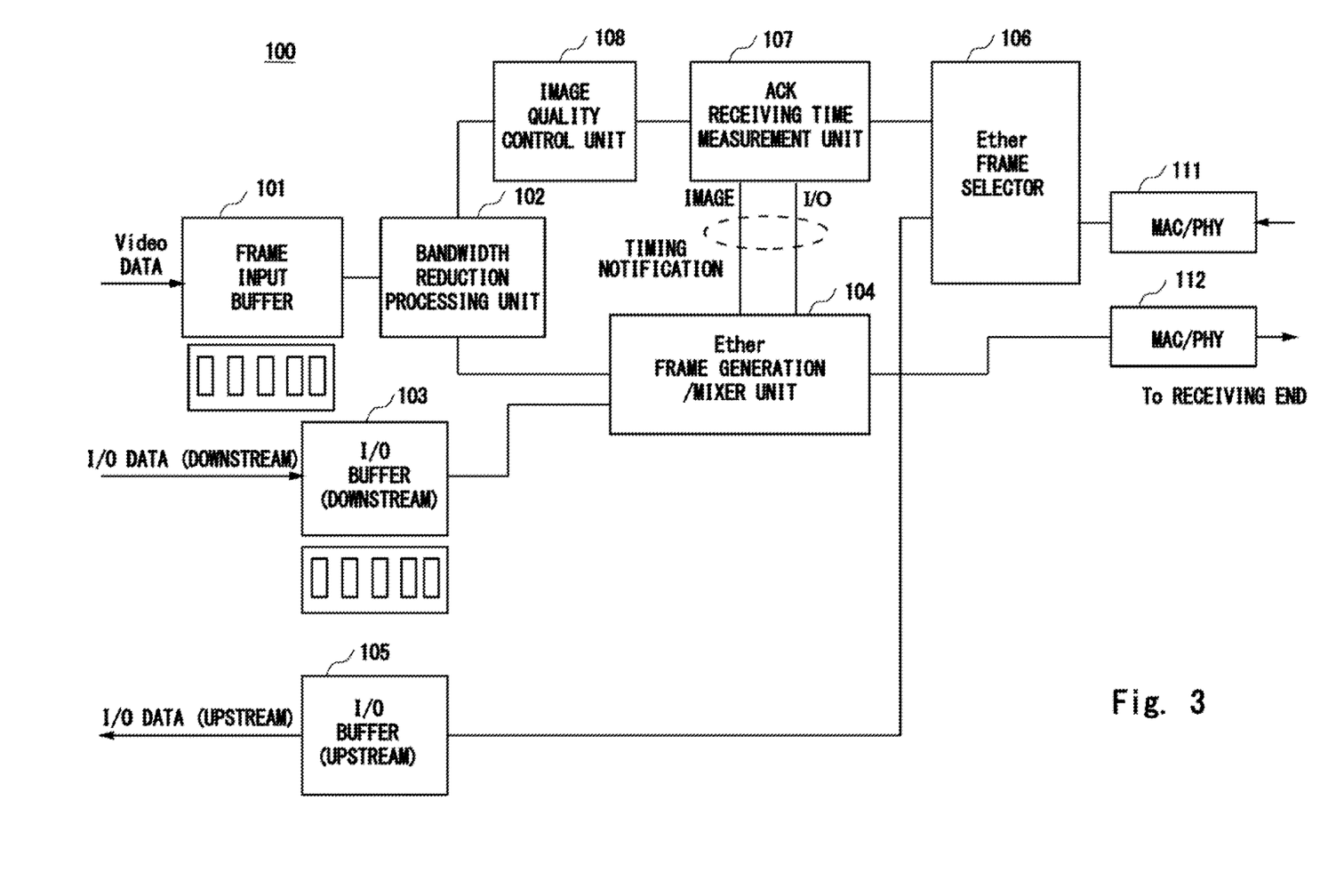
FIG. 3 is a block diagram showing the configuration of a transmitting end communication device according to a second example embodiment.
Figure 4:
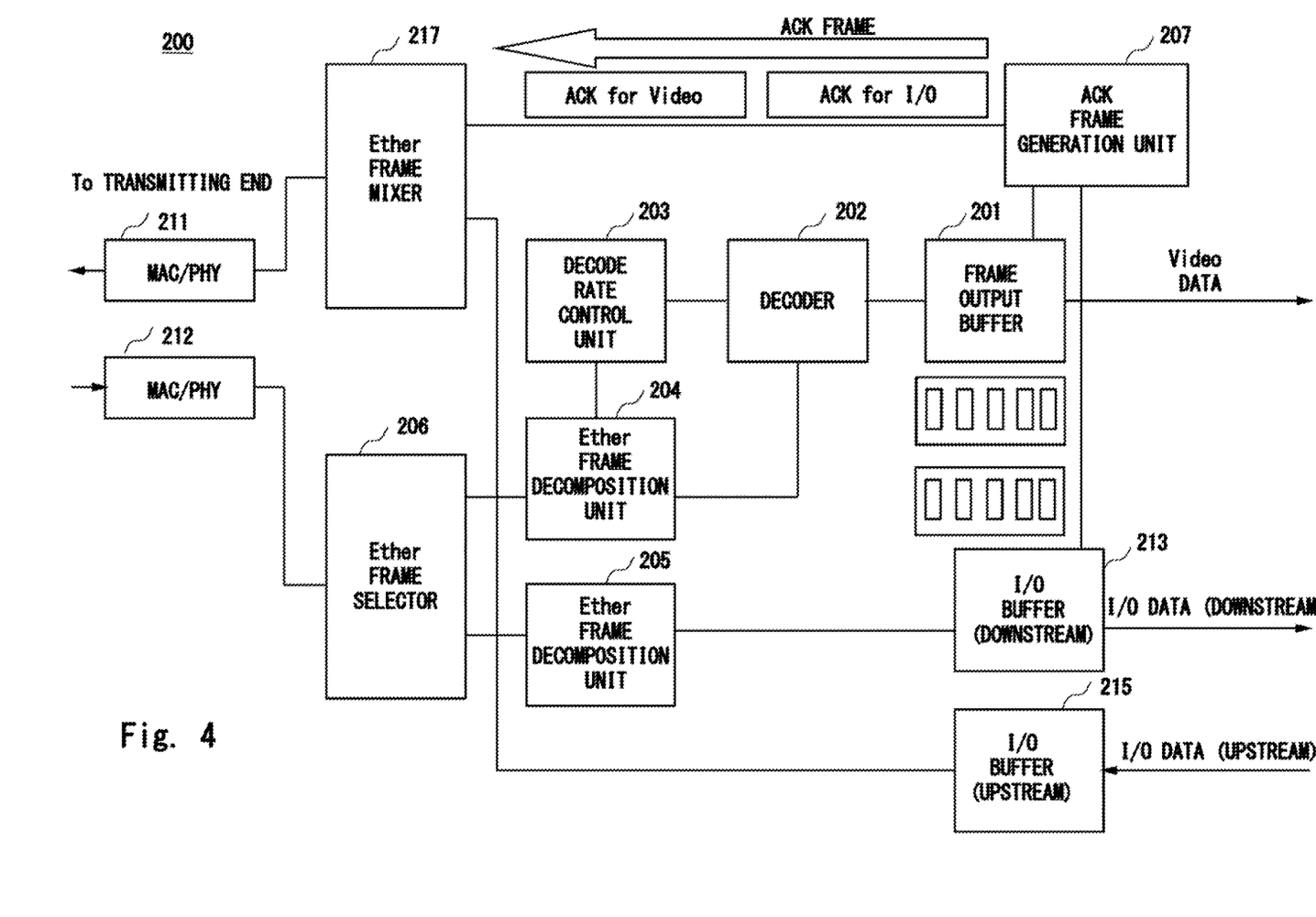
FIG. 4 is a block diagram showing the configuration of a receiving end communication device according to the second example embodiment.

FIG. 3 shows the configuration of a transmitting end communication device 100 and FIG. 4 shows the configuration of a receiving end communication device 200 in a diagnostic imaging system that transmits and receives an I/O signal and an image signal through the same transmission line.

FIG. 3 is a block diagram showing the configuration of a transmitting end communication device according to the second example embodiment.

The transmitting end communication device 100 can be implemented by an information processing device or the like that includes a processor such as a CPU (Central Processing Unit) and a memory, for example. The transmitting end communication device 100 is an example of the first communication device 10 according to the first example embodiment. Referring to FIG. 3, the transmitting end communication device 100 includes a frame input buffer 101, an I/O buffer (downstream) 103, an I/O buffer (upstream) 105, a bandwidth reduction processing unit 102, an Ether frame generation/mixer unit 104, an Ether frame selector 106, an ACK receiving time measurement unit 107, and an image quality control unit 108.

The frame input buffer 101 receives, for each frame, a still image and video data from a video camera or the like, and temporarily stores them. The I/O buffer (downstream) 103 receives I/O data (downstream) from a GPIO or the like in the PCI (Peripheral Component Interconnect) Express (registered trademark) standard, for example, and temporarily stores this data. The I/O buffer (upstream) 105 receives I/O data (upstream) from a GPIO or the like in the PCI (Peripheral Component Interconnect) Express (registered trademark) standard, for example, and temporarily stores this data.

The bandwidth reduction processing unit 102 appropriately compresses image data for each frame from the frame input buffer 101, and reduces the bandwidth. The bandwidth reduction processing unit 102 encodes the image data according to an instruction about a compression ratio, a compression method and the like from the image quality control unit 108, and transmits the encoded data to the Ether frame generation/mixer unit 104, as described in detail later. The bandwidth reduction processing unit 102 is also called an encoder in some cases.

The Ether frame generation/mixer unit 104 mixes the encoded image data from the bandwidth reduction processing unit 102 and the I/O transaction data from the I/O buffer (downstream) 103 and thereby generates an Ether frame. Further, the Ether frame generation/mixer unit 104 sends a timing notification indicating a transmitted time of each of the image and the I/O to the ACK receiving time measurement unit 107. The Ether frame generation/mixer unit 104 sorts out the Ether frame of the image and the Ether frame of the I/O and then sends a timing notification to the ACK receiving time measurement unit 107 at the timing of transmitting each Ether frame to the receiving end communication device 200.

The ACK receiving time measurement unit 107 measures a period of time (ACK receiving time) from when the Ether frame generation/mixer unit 104 transmits a frame to when ACK corresponding to this frame arrives from the receiving end communication device 200. Particularly, the ACK receiving time measurement unit 107 measures the ACK receiving time for an image frame and the ACK receiving time for an I/O signal, and estimates the utilization rate of each of a frame output buffer 201 and an I/O buffer (downstream) 213 on the basis of each receiving time. The ACK receiving time measurement unit 107 can estimate that the free space of the receiving buffer is large when the ACK receiving time is short and, in contrast, estimate that the free space of the receiving buffer is small when the ACK receiving time is long. After that, the ACK receiving time measurement unit 107 sends the estimated utilization rate of each receiving buffer, the bandwidth utilization and the like to the image quality control unit 108. The image quality control unit 108 determines appropriate compression ratio and compression method of the image data on the basis of the utilization rate of each receiving buffer for the image frame and the I/O signal, and gives an instruction to the bandwidth reduction processing unit 102.

The transmitting end communication device 100 further includes MAC/PHY 111 and 112, which are MAC (Medium Access Control) layer and physical (PHY) layer, and respectively connected to MAC/PHY 211 and 212 of the receiving end communication device through a network.

FIG. 4 is a block diagram showing the configuration of a receiving end communication device according to the second example embodiment.

The receiving end communication device 200 can be implemented by an information processing device or the like that includes a processor such as a CPU (Central Processing Unit) and a memory, for example. The receiving end communication device 200 is an example of the second communication device 20 according to the first example embodiment. Referring to FIG. 4, the receiving end communication device 200 includes an Ether frame selector 206, an Ether frame decomposition unit 204, a decode rate control unit 203, a decoder 202, a frame output buffer 201, and an ACK frame generation unit 207. The receiving end communication device 200 further includes an Ether frame decomposition unit 205, an I/O buffer (downstream) 213, and an I/O buffer (upstream) 215.

The Ether frame selector 206 selects the storage location of the receiving buffer (the frame output buffer 201 or the I/O buffer (downstream) 213) depending on whether the Ether frame received from the transmitting end communication device 100 is image data or I/O transaction data. Specifically, when the received Ether frame is image data, the Ether frame selector 206 selectively transfers the data to the Ether frame decomposition unit 204, and when the received Ether frame is an I/O signal, the Ether frame selector 206 selectively transfers the signal to the Ether frame decomposition unit 205.

The Ether frame decomposition unit 204 acquires, from the Ether frame, the contents related to the still image and the video data. The decode rate control unit 203 determines a bandwidth reduction method for the image data from the Ether frame decomposition unit 204, and gives an instruction to the decoder 202. The decoder 202 decodes the image data according to the instruction from the decode rate control unit 203. The frame output buffer 201 temporarily stores the frame data decoded by the decoder 202.

On the other hand, the Ether frame decomposition unit 205 acquires the contents related to the I/O transaction data from the Ether frame from the Ether frame selector 206. Further, the I/O buffer (downstream) 213 temporarily stores the I/O data signal to a port in the PCI Express (registered trademark) standard, for example. The I/O buffer (upstream) 215 temporarily stores the I/O data signal from a port in the PCI Express (registered trademark) standard, for example.

Figure 5:
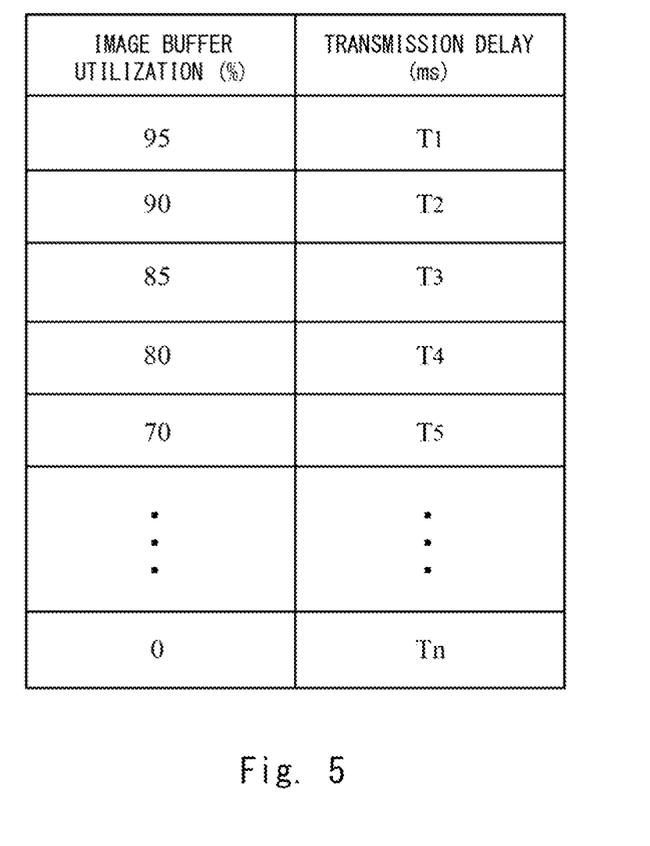
FIG. 5 is a table showing transmission delay responsive to the utilization rate of an image receiving buffer.
Figure 6:
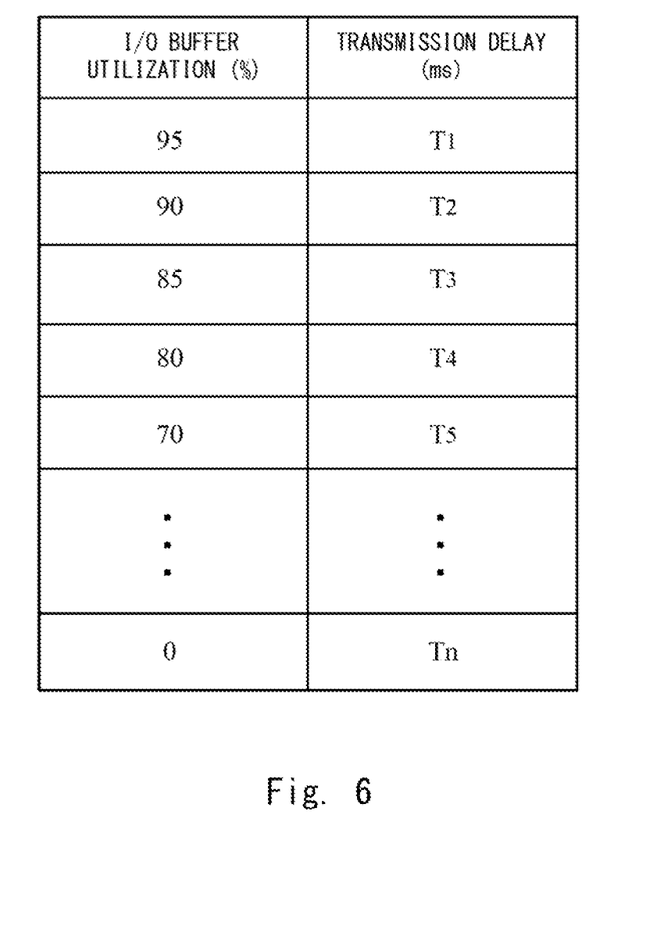
FIG. 6 is a table showing transmission delay responsive to the utilization rate of an I/O receiving buffer.

The ACK frame generation unit 207 generates ACK at appropriate timing that reflects the utilization rate of each receiving buffer (the frame output buffer 201 and the I/O buffer (downstream) 213). To be specific, the ACK frame generation unit 207 generates an ACK frame for image data at the timing that reflects the utilization rate of the frame output buffer 201. Further, the ACK frame generation unit 207 generates an ACK frame for I/O data at the timing that reflects the utilization rate of the I/O buffer (downstream) 213. Each ACK frame is sent to an Ether frame mixer 217. As an example of the timing responsive to the utilization rate of each receiving buffer, the timing of returning an ACK frame may be delayed for a specified period of time when the utilization rate of the receiving buffer is a threshold is higher. To be more specific, the return timing may be delayed in a stepwise fashion (in the table of FIG. 5, transmission delay (ms) can be set to: $T_1 > T_2 > T_3 > T_4 > T_5 > \ldots > T_n$) according to the utilization rate of the receiving buffer (e.g., 95%, 90, 85, 80, . . . , 0%). Note that the transmission delay referred to herein is the delay time after the frame output buffer 201 generates an ACK frame until it transmits the ACK frame in consideration of the utilization rate of the receiving buffer. Further, the frame output buffer 201 and the I/O buffer (downstream) 213 may use different tables. FIG. 6 is a table showing transmission delay responsive to the utilization rate of the I/O receiving buffer. In FIG. 6, the transmission delay is set to be the same as the transmission delay responsive to the utilization rate of the receiving buffer of the frame output buffer 201; however, this is not limited thereto. Different transmission delay may be set according to different buffer utilization rates for the frame output buffer 201 and the I/O buffer (downstream) 213.

The Ether frame mixer 217 mixes the ACKs (the ACK frame for image data and the ACK frame for I/O data) generated in the ACK frame generation unit 207 and the downstream Ether frame received through the I/O buffer (upstream) 215, and transmits them to the transmitting end communication device 100.

In the case of transmitting and receiving an I/O signal and an image signal through the same transmission line, the bandwidth of the downstream transmission line is shared between image data and I/O data. Specifically, even if an image receiving buffer (the frame output buffer 201 in FIG. 4) has a free space, there is a possibility that the I/O buffer (downstream) 213 uses a large part of the bandwidth of the transmission line. Therefore, the ACK frame generation unit 207 estimates an available transmission line bandwidth from the available spaces of both of the frame output buffer 201 and the I/O buffer (downstream) 213, generates ACK frames (ACK for images and ACK for I/O) according to the respective channels, and transmits them to the Ether frame mixer 217. The Ether frame mixer 217 mixes the received ACK frame with the upstream I/O data transmitted from the I/O buffer (upstream) 215, and transmits them to the transmitting end communication device 100 in FIG. 3 via the MAC/PHY 211.

The Ether frame selector 106 of the transmitting end communication device 100 receives the upstream Ether frame, and then transmits it to the I/O buffer (upstream) 105 or the ACK receiving time measurement unit 107 depending on whether the Ether frame is an I/O frame or an ACK frame. Specifically, when the received Ether frame is an I/O frame, the Ether frame selector 106 transmits it to the I/O buffer (upstream) 105 in FIG. 1. The transmitted I/O frame is processed as a normal I/O packet. On the other hand, when the received Ether frame is an ACK frame, the Ether frame selector 106 transmits it to the ACK receiving time measurement unit 107.

As described earlier, the ACK receiving time measurement unit 107 receives a timing notification (which indicates a transmitted time) from the Ether frame generation/mixer unit 104 after the Ether frame of the image and the Ether frame of the I/O are sorted out. Further, the ACK receiving time measurement unit 107 receives the ACK frame for image data and the ACK Frame for I/O data generated in the ACK frame generation unit 207 of the receiving end communication device 200 and acquires a received time. The ACK receiving time measurement unit 107 sorts out the image Ether frame and the I/O Ether frame, compares the transmission history and the reception history, and thereby measures the receiving time of each frame. The ACK receiving time measurement unit 107 can estimate the utilization rate of the frame output buffer 201 of the receiving end communication device 200 from the receiving time related to the image Ether frame. Further, the ACK receiving time measurement unit 107 can estimate the utilization rate of the I/O buffer (downstream) 213 of the receiving end communication device 200 from the receiving time related to the I/O Ether frame. Furthermore, the ACK receiving time measurement unit 107 can estimate the bandwidth utilization of each of the I/O and image frames in the same transmission line from the receiving time related to the image Ether frame and the receiving time related to the I/O Ether frame. After that, the estimated utilization rates of the receiving buffers and the bandwidth utilization are sent to the image quality control unit 108.

The image quality control unit 108 instructs the bandwidth reduction processing unit 102 to reduce image data appropriately for diagnosis on the basis of the utilization rate of each receiving buffer and the bandwidth utilization in order to prevent the lack of an image frame. As described earlier, the ACK receiving time measurement unit 107 manages a history of the transmission timing of each of I/O and image frames and the ACK reception timing. When the image quality control unit 108 determines, from this history, that I/O transaction is busy and the bandwidth to transmit the image frame is not enough, for example, it can reflect this result on image control.

Specifically, as shown in FIGS. 3 and 4, in the case of transmitting and receiving an I/O signal and an image signal through the same transmission line, the ACK receiving time measurement unit 107 estimates the congestion from the remaining space of the frame output buffer 201 of the receiving end communication device 200 (FIG. 2) and further estimates the bandwidth utilization of each of the I/O and image frames on the basis of the transmission and reception histories of each of the I/O and image frames. This enables more appropriate control of the compression ratio of the codec of the image.

Figure 7:
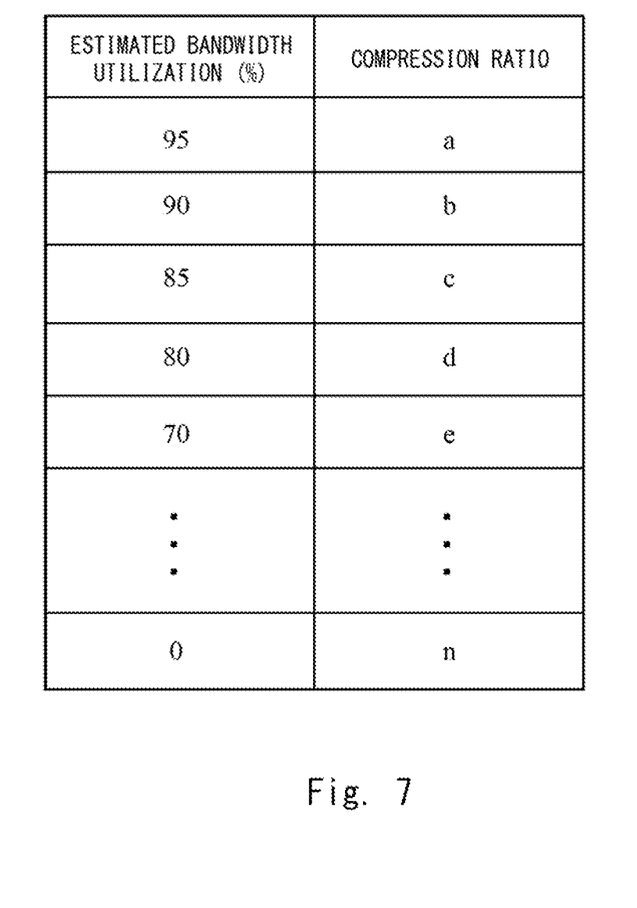
FIG. 7 is a table showing the compression ratio responsive to estimated bandwidth utilization.

FIG. 7 is a table showing the compression ratio responsive to estimated bandwidth utilization. On the basis of this table, the image quality control unit 108 may set the compression ratio to be higher (e.g., a>b>c>d>e . . . n in FIG. 7) as the bandwidth utilization increases. Further, when the bandwidth utilization is less than a threshold, the image quality control unit 108 may disable compression. The transmitting end communication device 100 can thereby basically transmit uncompressed RAW data to the receiving end communication device 200. Further, in the event of congestion, the transmitting end communication device 100 compresses an image frame and transmits it to the receiving end communication device 200 (diagnostic imaging device), and thereby prevents the lack of an image and improves the defect detection rate. This also enables continuous execution of I/O transaction. A parameter for determining the compression ratio of an image frame can be the utilization rate of a receiving buffer in addition to the estimated bandwidth. For example, when the I/O transaction is large and the bandwidth is small, compression of the image frame is needed. However, even when the I/O transaction is small and the bandwidth is not full, if the estimated utilization rate of the receiving buffer is high, reduction of the image data size is required to prevent the buffer overflow, and therefore compression of the image frame with a high compression ratio is needed.

According to this example embodiment, a first advantageous effect is improvement of the defect detection rate in the diagnostic imaging system. By transmitting image data necessary for diagnosis to the receiving end communication device on the diagnosing side without causing the overflow of an image receiving buffer in the diagnostic imaging system, diagnosis of a sequence of images is performed with no omission.

Further, according to this example embodiment, a second advantageous effect is improvement of the reliability of defect detection in the diagnostic imaging system. In the case where an existing system lacks one of 100 images, for example, it is unknown for which inspection object the one image is missing and which products the remaining 99 non-defective items are associated with. This causes a decrease in the reliability of diagnosis for the other non-defective items as well. By achieving 100% inspection without the overflow of a receiving buffer, an object to be inspected and an image completely correspond to each other, which enhances the reliability of diagnosis between defective and non-defective.

Figure 8:
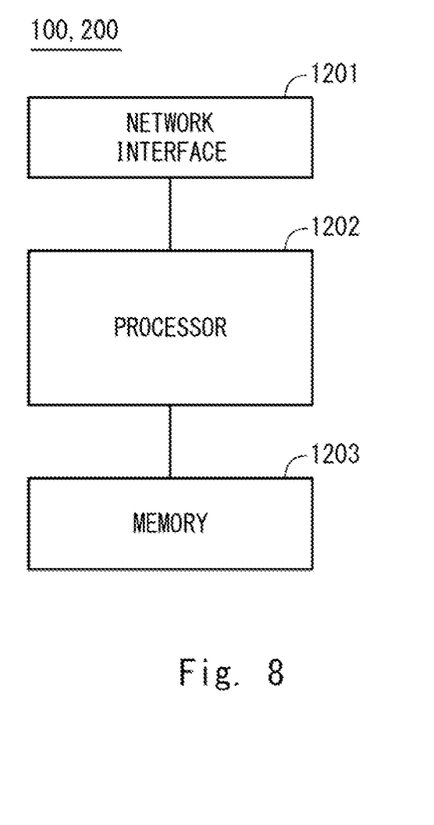
FIG. 8 is a block diagram showing a hardware configuration example of the transmitting end communication device and the receiving end communication device.

FIG. 8 is a block diagram showing a configuration example of the transmitting end communication device 100 and the receiving end communication device 200 (which are referred to hereinafter as the transmitting end communication device 100 etc.). Referring to FIG. 8, the transmitting end communication device 100 etc. includes a network interface 1201, a processor 1202, and a memory 1203. The network interface 1201 is used to communicate with another network node that constitutes the communication system. The network interface 1201 may be used to perform radio communication. For example, the network interface 1201 may be used to perform wireless LAN communication defined by IEEE 802.11 series or mobile communication defined by 3GPP (3rd Generation Partnership Project). Alternatively, the network interface 1201 may include a network interface card (NIC) that complies with the IEEE 802.3 series, for example.

The processor 1202 reads and runs software (computer program) from the memory 1203 and thereby executes processing of the transmitting end communication device 100 etc. that is described with reference to the flowchart or the sequence chart in the example embodiments described above. The processor 1202 may be a microprocessor, an MPU (Micro Processing Unit) or a CPU (Central Processing Unit), for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 through an I/O interface, which is not shown.

In the example of FIG. 8, the memory 1203 is used to store a group of software modules. The processor 1202 performs the processing of the transmitting end communication device 100 etc. described in the above example embodiments by reading the group of software modules from the memory 1203 and executing them.

As described with reference to FIG. 8, each of processors included in the transmitting end communication device 100 etc. runs one or a plurality of programs including a group of instructions for causing a computer to perform the algorithms described using the drawings.

In the above example, the program can be stored and provided to a computer using any type of non-transitory computer readable medium. Non-transitory computer readable media include any type of tangible storage medium. Examples of the non-transitory computer readable media include magnetic storage media (e.g., flexible disks, magnetic tapes, hard disk drives, etc.), optical magnetic storage media (e.g. magneto-optical disks), CD-ROM (Read Only Memory), CD-R, CD-R/W, DVD (Digital Versatile Disc), BD (Blu-ray (registered trademark) Disc), semiconductor memories (e.g., mask ROM, PROM (Programmable ROM), EPROM (Erasable PROM), flash ROM, and RAM (Random Access Memory)). The program may be provided to a computer using any type of transitory computer readable medium. Examples of transitory computer readable media include electric signals, optical signals, and electromagnetic waves. The transitory computer readable medium can provide the program to a computer via a wired communication line such as an electric wire or an optical fiber, or a wireless communication line.

Note that the present invention is not limited to the above-described example embodiments and can be modified as appropriate without departing from the spirit and scope of the present disclosure.

The whole or part of the example embodiments disclosed above can be described as, but not limited to, the following supplementary notes.

(Supplementary note 1) A communication control system that transmits image frame data and I/O data through the same transmission line from a first communication device to a second communication device, the second communication device comprising:
  a frame receiving buffer configured to receive image frame data from the first communication device;
  an I/O receiving buffer configured to receive I/O data from the first communication device; and
  a return unit configured to return an image ACK frame to the first communication device at a timing reflecting a utilization rate of the frame receiving buffer, and return an I/O ACK frame to the first communication device at a timing reflecting a utilization rate of the I/O receiving buffer, and
  the first communication device comprising:
  an estimation unit configured to receive the image ACK frame from the return unit of the second communication device and estimate the utilization rate of the frame receiving buffer of the second communication device from a receiving time of the image ACK frame, receive the I/O ACK frame from the return unit of the second communication device and estimate the utilization rate of the I/O receiving buffer of the second communication device from a receiving time of the I/O ACK frame, and thereby estimate bandwidth utilization of the transmission line for the image frame data and the I/O data;
  a modification unit configured to modify an image compression algorithm of the image frame data on the basis of the utilization rate of the frame receiving buffer and the bandwidth utilization of the transmission line estimated for each of the image frame data and the I/O data; and
  a transmitting unit configured to transmit the image frame data and the I/O data through the same transmission line from the first communication device to the second communication device.

(Supplementary note 2) The communication control system according to note 1, wherein the image compression algorithm includes color clustering.

(Supplementary note 3) The communication control system according to note 1 or 2, wherein the image compression algorithm includes a compression ratio.

(Supplementary note 4) The communication control system according to any one of notes 1 to 3, wherein the return unit transmits the image ACK frame at a timing that is increasingly delayed in a stepwise fashion as the utilization rate of the frame receiving buffer increases.

(Supplementary note 5) The communication control system according to any one of notes 1 to 4, wherein the return unit transmits the I/O ACK frame at a timing that is increasingly delayed in a stepwise fashion as the utilization rate of the I/O receiving buffer increases.

(Supplementary note 6) The communication control system according to any one of notes 1 to 5, wherein the modification unit sets the image frame data to uncompressed image data when the bandwidth utilization of the transmission line is less than a threshold.

(Supplementary note 7) The communication control system according to any one of notes 1 to 6, wherein
  the estimation unit calculates a receiving time of the image ACK frame by comparing a transmitted time of the image frame data transmitted by the transmitting unit with a receiving time of the image ACK frame for the image frame data, and estimates the utilization rate of the frame receiving buffer from the calculated ACK receiving time, and
  the estimation unit calculates a receiving time of the I/O ACK frame by comparing a transmitted time of the I/O data transmitted by the transmitting unit with a received time of the I/O ACK frame for the I/O data, and estimates the utilization rate of the I/O receiving buffer from the calculated ACK receiving time.

(Supplementary note 8) A communication control method that transmits image frame data and I/O data through the same transmission line from a first communication device to a second communication device, comprising:
  in the second communication device,
  receiving, by a frame receiving buffer, image frame data from the first communication device;
  receiving, by an I/O receiving buffer, I/O data from the first communication device; and
  returning an image ACK frame to the first communication device at timing reflecting a utilization rate of the frame receiving buffer, and returning an I/O ACK frame to the first communication device at a timing reflecting a utilization rate of the I/O receiving buffer, and
  in the first communication device,
  receiving the image ACK frame from the second communication device and estimating the utilization rate of the frame receiving buffer of the second communication device from a receiving time of the image ACK frame, receiving the I/O ACK frame from the second communication device and estimating the utilization rate of the I/O receiving buffer of the second communication device from a receiving time of the I/O ACK frame, and thereby estimating bandwidth utilization of the transmission line for each of the image frame data and the I/O data;
  modifying an image compression algorithm of the image frame data on the basis of the utilization rate of the frame receiving buffer and the bandwidth utilization of the transmission line estimated for each of the image frame data and the I/O data; and
  transmitting the image frame data and the I/O data through the same transmission line from the first communication device to the second communication device.

Although the present invention is described above with reference to the example embodiments, the present invention is not limited to the above-described example embodiments. Various changes and modifications as would be obvious to one skilled in the art may be made to the structure and the details of the present invention without departing from the scope of the invention.

This application is based upon and claims the benefit of priority from Japanese patent application No. 2020-041849 filed on Mar. 11, 2020, the disclosure of which is incorporated herein in its entirety by reference.

REFERENCE SIGNS LIST

10 FIRST COMMUNICATION DEVICE
11 ESTIMATION UNIT
12 MODIFICATION UNIT
13 TRANSMITTING UNIT
20 SECOND COMMUNICATION DEVICE
21 RETURN UNIT
22 FRAME RECEIVING BUFFER
23 I/O RECEIVING BUFFER
100 TRANSMITTING END COMMUNICATION DEVICE
101 FRAME INPUT BUFFER
102 BANDWIDTH REDUCTION PROCESSING UNIT
103 I/O BUFFER (DOWNSTREAM)
104 ETHER FRAME GENERATION/MIXER UNIT
105 I/O BUFFER (UPSTREAM)
106 ETHER FRAME SELECTOR
107 ACK RECEIVING TIME MEASUREMENT UNIT
108 IMAGE QUALITY CONTROL UNIT
111 MAC/PHY
112 MAC/PHY
200 RECEIVING END COMMUNICATION DEVICE
201 FRAME OUTPUT BUFFER
202 DECODER
203 DECODE RATE CONTROL UNIT
204 ETHER FRAME DECOMPOSITION UNIT
205 ETHER FRAME DECOMPOSITION UNIT
206 ETHER FRAME SELECTOR
207 ACK FRAME GENERATION UNIT
211 MAC/PHY
212 MAC/PHY
213 I/O BUFFER (DOWNSTREAM)
215 I/O BUFFER (UPSTREAM)
217 ETHER FRAME MIXER

What is claimed is:

1. A communication control system that transmits image frame data and I/O data through the same transmission line from a first communication device to a second communication device,
the second communication device comprising:
a frame receiving buffer configured to receive image frame data from the first communication device;
an I/O receiving buffer configured to receive I/O data from the first communication device; and
a return unit configured to return an image ACK frame to the first communication device at a timing reflecting a utilization rate of the frame receiving buffer, and return an I/O ACK frame to the first communication device at a timing reflecting a utilization rate of the I/O receiving buffer, and
the first communication device comprising:
an estimation unit configured to receive the image ACK frame from the return unit of the second communication device and estimate the utilization rate of the frame receiving buffer of the second communication device from a receiving time of the image ACK frame, receive the I/O ACK frame from the return unit of the second communication device and estimate the utilization rate of the I/O receiving buffer of the second communication device from a receiving time of the I/O ACK frame, and thereby estimate bandwidth utilization of the transmission line for the image frame data and the I/O data;
a modification unit configured to modify an image compression algorithm of the image frame data on the basis of the utilization rate of the frame receiving buffer and the bandwidth utilization of the transmission line estimated for each of the image frame data and the I/O data; and
a transmitting unit configured to transmit the image frame data and the I/O data through the same transmission line from the first communication device to the second communication device,
wherein the image compression algorithm includes a compression ratio,
wherein the return unit transmits the image ACK frame at a timing that is increasingly delayed in a stepwise fashion as the utilization rate of the frame receiving buffer increases, and
wherein the return unit transmits the I/O ACK frame at a timing that is increasingly delayed in a stepwise fashion as the utilization rate of the I/O receiving buffer increases.

2. The communication control system according to claim 1, wherein the image compression algorithm includes color clustering.

3. The communication control system according to claim 1, wherein the modification unit sets the image frame data to uncompressed image data when the bandwidth utilization of the transmission line is less than a threshold.

4. The communication control system according to claim 1, wherein
the estimation unit calculates a receiving time of the image ACK frame by comparing a transmitted time of the image frame data transmitted by the transmitting unit with a receiving time of the image ACK frame for the image frame data, and estimates the utilization rate of the frame receiving buffer from the calculated ACK receiving time, and
the estimation unit calculates a receiving time of the I/O ACK frame by comparing a transmitted time of the I/O data transmitted by the transmitting unit with a received time of the I/O ACK frame for the I/O data, and estimates the utilization rate of the I/O receiving buffer from the calculated ACK receiving time.

5. A communication control method that transmits image frame data and I/O data through the same transmission line from a first communication device to a second communication device, comprising:
in the second communication device,
receiving, by a frame receiving buffer, image frame data from the first communication device;
receiving, by an I/O receiving buffer, I/O data from the first communication device; and
returning an image ACK frame to the first communication device at timing reflecting a utilization rate of the frame receiving buffer, and returning an I/O ACK frame to the first communication device at a timing reflecting a utilization rate of the I/O receiving buffer, and
in the first communication device,
receiving the image ACK frame from the second communication device and estimating the utilization rate of the frame receiving buffer of the second communication device from a receiving time of the image ACK frame, receiving the I/O ACK frame from the second communication device and estimating the utilization rate of the I/O receiving buffer of the second communication device from a receiving time of the I/O ACK frame, and thereby estimating bandwidth utilization of the transmission line for each of the image frame data and the I/O data;
modifying an image compression algorithm of the image frame data on the basis of the utilization rate of the frame receiving buffer and the bandwidth utilization of the transmission line estimated for each of the image frame data and the I/O data; and transmitting the image frame data and the I/O data through the same transmission line from the first communication device to the second communication device, wherein the image compression algorithm includes a compression ratio, wherein the image ACK frame is transmitted at a timing that is increasingly delayed in a stepwise fashion as the utilization rate of the frame receiving buffer increases, and wherein the I/O ACK frame is transmitted at a timing that is increasingly delayed in a stepwise fashion as the utilization rate of the I/O receiving buffer increases.

* * * * *